United States Patent [19]
Schweitzer et al.

[11] Patent Number: 5,804,373
[45] Date of Patent: Sep. 8, 1998

[54] MOLECULAR AUTOMATA UTILIZING SINGLE- OR DOUBLE-STRAND OLIGONUCLEOTIDES

[75] Inventors: Allan Lee Schweitzer; Warren D. Smith, both of Plainsboro, N.J.

[73] Assignee: NEC Research Institute, Inc., Princeton, N.J.

[21] Appl. No.: 414,398

[22] Filed: Mar. 31, 1995

[51] Int. Cl.$^6$ .................................................. C12Q 1/68
[52] U.S. Cl. ................................. 435/6; 702/19; 702/20
[58] Field of Search .................................. 435/6; 702/19, 702/20

[56] References Cited

PUBLICATIONS

Rozen et al. (1996) Current Biol. 6:254–257.
Richard J. Lipton, "Speeding Up Computations via Molecular Biology," Dec. 9, 1994 (available at/ftp/pub/people/rjl/bio.ps on ftp.cs.princeton.edu).
Leonard M. Adleman, "Molecular Computation of Solutions to Combinatorial Problems," Science, vol. 266, Nov. 11, 1994, pp. 1021–1024.
Allen Hjelmfelt et al, "Chemical implementation of neural networks and Turing machines," Proc. Natl. Acad. Sci USA, vol. 88, No. 24, Dec. 1991, pp. 10983–10987.
Stephen P.A. Fodor et al, "Multiplexed biochemical assays with biological chips," Nature, vol. 364, Aug. 5, 1993, pp. 555–556.
Donald Beaver, "A Universal Molecular Computer," Feb. 6, 1995, available at http://www.cse.psu.edu/~beaver/publications/tm.ps.Z.

*Primary Examiner*—John L. LeGuyader
*Assistant Examiner*—Robert Schwartzman
*Attorney, Agent, or Firm*—Philip J. Feig

[57] ABSTRACT

Single- or double-strand oligonucleotides are used to create a molecular automata. The preferred embodiment is a DNA Turing machine and a method of performing a transition in such a DNA Turing machine.

33 Claims, 4 Drawing Sheets

MOLECULAR AUTOMATA UTILIZING SINGLE- OR DOUBLE-STRAND OLIGONUCLEOTIDES

FIELD OF THE INVENTION

The present invention relates to the use of single- or double-strand oligonucleotides to create molecular-scale automata in vitro, including "string processing" and Turing machines.

BACKGROUND OF THE INVENTION

The present invention concerns molecular automata utilizing single- or double-strand oligonucleotides (i.e., RNA, DNA, or RNA-DNA hybrids) to retain "state" information and utilizing oligonucleotide sequences to represent the machine transition table (deterministic or nondeterministic). These machines may include "string-processing" machines as well as Turing machines.

More specifically, the present invention preferably concerns a molecular-scale Turing machine in vitro. Turing machines are simple but universal computers; that is, it is possible to write a program to run on a Turing machine which will emulate any computer performing any computational task, such that this emulation will have a slowdown ratio bounded by a power law. Turing machines, particularly non-deterministic machines are a very general type of automata, such as "finite-state" or "pushdown" automata. Since the building blocks are single- or double-strand oligonucleotides, i.e., RNA, DNA, or RNA-DNA hybrids, the present Turing machines are available in huge quantities, and a programmer can insert nondeterministic choice steps into the program which a predetermined percentage of the molecules will perform in one manner, and the remainder of the molecules will perform in another manner. The result is parallel operation.

The use of DNA molecules to perform computation was first described in an article by L. Adleman entitled "Molecular Computation of Solutions to Combinatorial Problems" in Science, volume 266, Nov. 11, 1994, at pages 1021 to 1024.

Adleman chose a simple example: given a set of 6 "cities" with some interconnecting (directed) "roads", find a path which visits each city exactly once. Adleman synthesized unique short (20-mer) nucleotide "tag" sequences to give each city a "from" and "to" address. Each road was represented by a 40-mer sequence containing the appropriate city tags in the correct order. In solution these single-stranded DNA molecules randomly hybridized to their complements, forming longer strands which were double-stranded in complementary regions. After allowing approximately one day for the strands to hybridize, DNA ligase and polymerase was used to "sew-up" the strands, yielding a set of DNA molecules representing all possible paths in the graph. Chemical and physical operations were performed to extract from the mixture only the DNA molecules which corresponded to Hamiltonian paths.

The total number of separation and synthesis steps required grows linearly with the size (number of cities and roads) of the problem and an exponentially large number of DNA molecules are required, therefore the linear bound is applicable to a certain limit. Adleman suggests that since the number of DNA molecules in a mixture is large, there is a large constant speedup compared to a sequential implementation of the same procedure.

Exactly how large this parallelism factor can be made is not clear—since Adleman only solved a 6 city problem—but it is at least $10^{11}$ and no more than $10^{23}$. Each individual DNA step of the Adleman process required about one day, although it might be possible to reduce the time to $10^3$ or at best $10^2$ seconds, while the comparable steps on a modern digital computer take on the order of $10^{-8}$ seconds. Thus, the maximal speedup factor obtainable from these DNA methods is somewhere between $10^{-2}$ and $10^{+13}$.

Subsequently, R. J. Lipton in a manuscript dated Dec. 9, 1994 entitled "Speeding up Computation via Molecular Biology, presently available at /ftp/pub/people/rjl/bio.ps on ftp.cs.princeton.edu, showed how to use the same primitive DNA operations as Adleman to solve any "SAT" problem with N binary inputs and G AND, OR, or NOT gates, in a number of operations depending linearly on N+G. Lipton estimated that it would be feasible to solve such problems, using his procedure, as large as N=70.

However, ordinary sequential computers are not restricted to using such simple algorithms to solve NP-complete problems such as Hamiltonian path and SAT. Instead, they can use "branch and bound" algorithms, which, while still exponential, tend in practice to have much smaller growth constants than the simple algorithm.

The development of programs for rigorous solutions of traveling salesman problems had advanced by 1987 to the point where a 9000-line FORTRAN program on a Cyber 205 solved a real life fully-connected 2392 city TSP (traveling salesman problem) in a 27-hour run. Adleman's DNA method, despite its large parallelism factor, is unable to perform a 30-city TSP, since $30! \approx 4 \times 10^4 \times N_{Avogdro}$. "Hard" random 3CNF SAT problems, with N=300, are solvable by conventional computers in an average time of 10 to 20 minutes. This lies beyond Lipton's estimate of N=70 for the capabilities of the DNA based method. Selected algorithms can often achieve speedups much larger than a factor of $10^{12}$ speedup in a simple algorithm, so that Adleman and Lipton's DNA methods are not currently competitive.

In an article entitled "A Universal Molecular Computer" by D. Beaver, presently available at http://www.cse.psu.edu/~beaver/publications/tm.ps.Z, Adleman's work is extended to cover a molecular Turing machine. Beaver copies the entire DNA strand with each machine cycle. The result is that the process integrity is compromised by the polymerase infidelity. In addition, removal of excess restriction enzymes is very difficult. Contrariwise, in the present invention, the DNA is bound to a surface and all operations are in a single container thereby enabling removal of the restriction enzyme by means of a simple wash step.

A. Hjelmfelt et al in an article entitled "Chemical Implementation of Neural Networks and Turing Machines" in the Proceedings of the National Academy of Sciences USA, volume 88, number 24 (1991) at pages 10983 to 10987 suggested the possibility of a chemical Turing machine, but neither specific chemicals nor a complete construction was disclosed.

SUMMARY OF THE INVENTION

The way in which algorithms achieve good results on SAT and TSP is only to branch when they must. Thus when solving SAT, for example it might be proven by a backtrack search from the current configuration and the use of bounding theorems, that the next three bits must be either a '100' or '110.' In that case, it is not necessary to consider all 8 possibilities, but only 2 of them, and if this were to happen every time, the cost of the search would be $2^{N/3}$ instead of $2^N$. The programs that take advantage of such efficiencies may be thought of as programs on a nondeterministic Turing machine but in which the invocations of nondeterminism are carefully controlled and made as infrequent as possible.

It is most advantageous to be able to duplicate this capability (of allowing efficient programming, in which nondeterministic steps are done only at carefully selected locations in the program) with DNA, in order to achieve efficient algorithms and molecular scale parallelism.

Using presently known molecular biology laboratory techniques it is conceivable to create a nondeterministic Turing machine (NDTM).

Any program (with nondeterministic statements allowed) for a conventional computer may be executed on an NDTM, and if the (worst case, or average case) resources required by the conventional computer are bounded by $P_1(N)A^N$ where N is the number of bits in the input, $A \geq 1$ is a constant, and $P_1(N)$ is a polynomial, then the NDTM will require resources bounded by $P_2(N)A^N$, where $P_2$ is another polynomial. Indeed, any conventional computer may be simulated by an NDTM with only polynomial slowdown. Thus any efficient algorithms which tend to reduce the growth constant A, will still be that way in the DNA version. Also, so long as there is sufficient DNA, the NDTM according to the present invention will solve any problem in NP in polynomial time.

A principal object of the present invention is the provision of a Turing machine using DNA.

Another object of the present invention is the provision of a Turing machine using DNA performing transitions using conventional laboratory techniques.

Further and still other objects of the present invention will become more clearly apparent when the following description is read in conjunction with the accompanying drawing.

BRIEF DESCRIPTION OF THE DRAWING

FIG. 3 illustrates the relationship of FIGS. 3a and 3b.

DETAILED DESCRIPTION OF THE INVENTION

Before providing a detailed description of the invention, some definitions will facilitate a better understanding of the invention.

A finite state machine is a finite set of states and finite list of transition rules. Each transition rule is of the form "if you are in state '52' and encounter an input 'c', then go to state '31' and output 'g'." The inputs and outputs are optional.

A Turing machine (TM) is similar to a finite state machine, except that it is equipped with a 1-dimensional "tape" that can be used for storing information. The tape is of infinite length and is divided into squares, and in each square, a character may be written. The machine is defined by a finite set of rules of the form "if you are in state '76' and the current tape square has the character 'd', then go to state '23', overwrite the current tape square with 'h', and move one square 'left' on the tape." In these rules, the overwriting is optional, and the movement need not be leftward, it could instead be rightward, or no movement at all, depending on the rule.

By convention, Turing machines usually have a special 'halt' state from which no transition is possible, and initially, all but a finite portion of the tape squares are blank. Once the initial message (or "input," or "data and program") has been pre-written on the tape, and the Turing machine is activated, the rest of its actions are predetermined and no further interaction with an operator is required.

Turing machines are universal over the class of all machines that would commonly be called computers. Furthermore, there exist particular universal Turing machines (several have been constructed) and any one of them can emulate any other reasonable kind of computer with at most polynomial slowdown.

A so-called nondeterministic Turing machine (NDTM) has a set of transition rules which need not specify a unique action—they can specify two or more contradictory actions. For example, one rule could say to move right, another rule could say to move left. In that case, the NDTM splits into two NDTMs, one of which moves left and one of which moves right, and they both continue on from their new respective position.

The class of problems which a universal Turing machine can solve in a number of steps bounded by a polynomial of the number of bits in its input, is called "P." The class of problems which a nondeterministic universal Turing machine can solve (that is, which at least one of the alter egos solves) in a number of steps bounded by a polynomial of the number of bits in its input, is called "NP." A problem class X, such that any problem in NP can be rephrased as a problem of the form X (and the rephrasing task is in P) is called "NP-complete." The traveling salesman problem, graph coloring, and a logic problem called "SAT" are known NP-complete problem classes. It is widely conjectured that P⊂NP and that NP-complete problems would require, in the worst case, exponential time to be solved by a (deterministic) TM.

PSPACE is the class of problems which can be solved by TMs which only visit a region of their tape having polynomially large extent. EXPTIME is the class of problems which can be solved by TMs in exponential time. Solving positions of certain games, such as n×n checkers, is known to be EXPTIME complete. It is widely conjectured that NP⊂EXPTIME, so that even NDTMs could not solve such problems in polynomial time. However, a TM which not only could proliferate into several children (e.g. an NDTM) but also could obtain information back from said children, could solve n×n checkers in polynomial time. This fact illustrates the value of interprocessor communication.

The preferred Turing machine (TM) of the present invention comprises a circular loop of double stranded DNA. Actually there are a huge number of such loops, which is essential for providing a nondeterministic parallel capability. The following description will refer to a single circular loop for clarity. Initially, all the TMs are in identical starting states.

Most of the DNA sequence is divided into chunks or sequences of predetermined length representing the characters on the Turing machine's "tape." Suppose the chunks are 20 bases long and the Turing machine has an alphabet of size 26. It would be necessary to designate 26 unique 20-long sequences to represent all of the letters of the alphabet. There are certain constraints on the choice of these sequences: they need to be dissimilar and they need to avoid long palindromes and certain restriction enzyme subsequences. Palindromes refer to a substring S followed after some gap by its reversed complement that can cause hairpins which can stall polymerases and cause bacterial mutation hotspots.

The above constraints are satisfiable. The maximum possible number of letters l in a circular DNA string, so that no k-letter substring occurs twice, is $l=A^k$ where $A>1$ is the alphabet size and $A=4$ for DNA. (Here $1 \leq A^k$ is obvious, and this bound is met by radix-A DeBruijn sequences.) For noncircular DNA, $l=A^k+k-1$, achieved by noncircular DeBruijn sequences. If the appearance of any reversed order and complemented k-letter substring is also disallowed ("modified DeBruijn problem"), then $1 \leq A^k/2+A^{\lfloor k/2 \rfloor}/2+k-1$. This bound is tight when $k=1$, when $(k, A)=(4, 2)$, when $k=2$, and for no other $(k, A)$. The best lower bounds that we know for the length l of modified DeBruijn sequences for various $(k, A)$ are given in the table below ("." means "meets the upper bound formula" and "!" means "proven optimal by exhaustive search."):

|        | k = 1 | k = 2 | k = 3 | k = 4 | k = 5 | k = 6 | k = 7 | k = 8 | k = 9 | k = 10 | k = 11 | k = 12 |
|--------|-------|-------|-------|-------|-------|-------|-------|-------|-------|--------|--------|--------|
| A = 2  | 1.    | 4.    | 6!    | 13.   | 20!   | 39!   | 70!   | 137   | 264   | 441    | 1034   | 1494   |
| A = 3  | 2.    | 7.    | 16!   | 45    | 117   | 315   | 811   | 2078  | 5032  | 12377  |        |        |
| A = 4  | 2.    | 11.   | 34!   | 133   | 516   | 1749  | 8198  |       |       |        |        |        |
| A = 5  | 3.    | 16.   | 64    | 306   | 1359  | 5701  |       |       |       |        |        |        |
| A = 6  | 3.    | 22.   | 110   | 632   | 3892  | 18307 |       |       |       |        |        |        |
| A = 7  | 4.    | 29.   | 172   | 1106  | 6869  |       |       |       |       |        |        |        |
| A = 8  | 4.    | 37.   | 258   | 1946  | 16388 |       |       |       |       |        |        |        |
| A = 9  | 5.    | 46.   | 360   | 3019  | 21831 |       |       |       |       |        |        |        |
| A = 10 | 5.    | 56.   | 502   | 4622  |       |       |       |       |       |        |        |        |
| A = 11 | 6.    | 67.   | 656   | 6636  |       |       |       |       |       |        |        |        |
| A = 12 | 6.    | 79.   | 866   | 9496  |       |       |       |       |       |        |        |        |
| A = 13 | 7.    | 92.   | 1067  | 12650 |       |       |       |       |       |        |        |        |
| A = 14 | 7.    | 106.  | 1374  |       |       |       |       |       |       |        |        |        |

An example of a modified DeBruijn sequence with $A=4$, $k=4$, and $l=133$ is abcdabdcccaadddbcdbcacadbaacbccaba
bbdadabbadbcbcbbaabdaabbbbccdbddbd
acbdbdcaabcbaadadbbdbadcdddcdccacd
cbbcdcabddabacbaccbbbddddaadcba.

Between each such chunk is a separating "comma" which is another special 20-long sequence.

The tape is thus not infinite, but in fact is finite and circular. Since at this time it is doubtful that the present NDTM will be required to run for more than $10^5$ steps (and also since, as described below, the Turing machine can choose to create more tape) this is not a limitation.

At the far side of the circle (from the head), a special "anchor" subsequence would be located, which could serve to delineate "ends" of the tape and would more importantly be used for anchoring each DNA at a fixed location, rather than allowing it to float freely around in the mixture. This anchoring may be accomplished by the incorporation of special "biotinylized bases" into DNA in place of the usual nucleotides by the use of nonspecific polymerases; and then surfaces coated with streptavidin will strongly bind the biotinylized bases. The fact that the biotin-streptavidin complex, with a heat of formation of 23 Kcal/mole, is very stable to heat (up to 132° C.; it also is stable to pH 2–13 and proteases) will be important as described below. One recent technique (described in an article by S. P. A. Fodor et al entitled "Multiplexed Biochemical Assay with Biological Chips" in Nature, volume 364, August 1993 at pages 555–556) involving photosensitive endcaps allows one to anchor DNAs to a surface and then add to one end of each bound DNA molecule, a sequence specifying its xy coordinates on the surface, as a binary number.

While the classical Turing machine uses an infinite tape, the tape in the present invention is always finite, but potentially infinite, that is, new tape can be added at either end whenever necessary. One method of adding is to include in the anchor sequence, special "end" sequences. Whenever the Turing machine (traveling to the left) reaches the left end of the tape, it will encounter an anchor sequences. It is thus necessary to provide special transition matrix strings in order to insert a blank to the left of the head state sequence (which is invariant during this step). The same process is required when the Turing machine traveling to the right encounters the right end of the tape. The result is the ability to insert arbitrary length sequences and not merely a fixed-length symbol sets as is added in conventional operations.

Finally, there is a subinterval of the DNA that is going to represent the single "head" H of the TM and the character L immediately to the left of it. The head sequence of the machine refers to the current "internal state" of the Turing machine and is thus not a specific individual sequence, but rather is any of a set of predetermined sequences chosen to represent the internal states.

Figure 1:
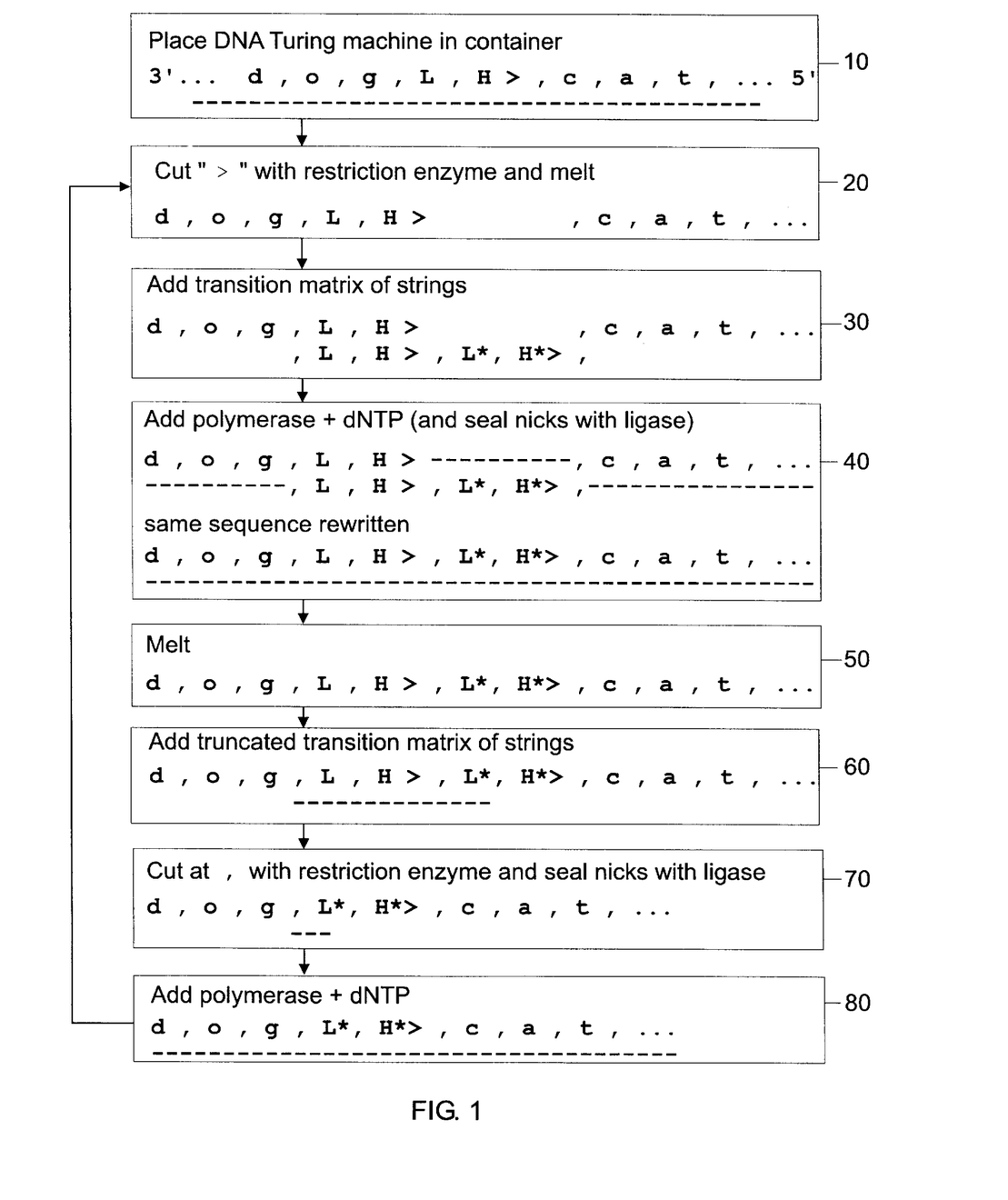
FIG. 1 is a flow chart of a DNA Turing machine transition process where the head remains stationary and L is overwritten as L*.

The transition process of a Turing machine is illustrated in the flow chart in FIG. 1. In FIG. 1 the Turing machine operation is assumed to be that the head remains in place and L is overwritten with L*. The sequence "d,o,g," are normal characters on the tape, as is the sequence "c,a,t, . . ." but L, H, and > are special and pertain to the head H and its immediately adjacent tape square L. Actually L is also a normal tape character; the only way in which it is special is the fact that it lies immediately to the left of the head. In the present Turing machine the head is located between two adjacent tape squares rather than on top of one of them. The Turing machine decides what to do next based on the current head state (here H) and the character (here L) to its left. The sequences in each box refer to the characters on the tape. The dashes refer to second strands.

After placing the DNA Turing machine in a container (step 10), the step 20 of the transition process is to use a restriction enzyme to cut the DNA at the right of the special subsequence indicated by the symbol '>'. This converts the DNA from circular to linear form and leaves "sticky ends." Then the restriction enzyme is removed from the container. Since the DNAs are anchored in place, this is accomplished by washing the DNA. At the same time the DNA is "melted" to convert it to single stranded form. (By using hot water, 94°–97° C., i.e. well above the melting temperature, which for *E. Coli* DNA is 69° C. and for *P. aeruginosa* is 77° C., the non-anchored strands are washed away.)

Generally, wash sequences involved in the process must be preceeded by denaturation at elevated temperature.

The following are a few examples of restriction enzymes from the over 1500 that are known. Of these, only EcoRII and BbvII would at first seem suitable for performing the role of ">," since only they have cut sites at the end of the recognized region. But actually, if the convention adopted was that, e.g., every character on the tape begins with A, then it would be possible to use HindIII, and so forth. (Here A=adenosine, T=thymine, G=guanine, C=cytosine, W={A or T}, N={A,T,G, or C}, and the bottom strand is here written in the 5' to 3' order in which polymerases synthesize DNA. Of the following restriction enzymes, only HindIII, HpaI, and SfiI were commercially available in 1991.)

| enzyme name | recognized sequence and cut \| location | |
| --- | --- | --- |
| EcoRII | GGWCC\|<br>\|CCWGG | (SEQ ID NO: 1) |
| EcoNI | GGANN N\|NNTCC<br>CCTNN\|N NNAGG<br>CTTCTGNN NNNN\| | (SEQ ID NO: 2) |
| BbvII | GAAGACNN\|NNNN<br>T TCGA\|A | (SEQ ID NO: 3) |
| HindIII | A\|AGCT T<br>CAA\|TTG | (SEQ ID NO: 4) |
| HpaI | GTT\|AAC<br>CC GC\|GG | (SEQ ID NO: 5) |
| NarI | GG\|CG GG<br>CCGG\|NNNN NCCGG | (SEQ ID NO: 6) |
| SfiI | GGCC NNNN\|NGGCC | (SEQ ID NO: 7) |

The time needed for step 20 should be approximately 30 to 100 minutes.

The EcoRI restriction enzyme is known to cut at its recognition site $(1–3) \times 10^5$ times more quickly than it makes erroneous cuts at random sites. Restriction enzymes only cut double strand DNA. Such imperfect specificity may set upper limits on the size of the Turing machine.

The next step 30 (after cooling down), is to pour into the container a mixture of single stranded DNA referred to as "the transition matrix" of strings. This particular mixture is available in large quantities and has a specific composition which is independent of the initial state of the Turing machine.

This transition matrix mixture preferably contains some DNA strands which begin with the antisense of, L , H >, continues with a comma ,, and further continues with the antisense of the new L* H* >, subsequence which would result from the TM performing one step, e.g. overwriting L with a new character L* and changing the head state to H*, and ends with the antisense of ,. In the event the TM step called for was not overwriting L, but instead moving the head left, the middle part of the transition matrix string would be of the form , H*>, L*, instead of , L*, H*>.

In the event that a nondeterministic combination of these two operations was called for, then both these strings would be present in the transition matrix. In fact, the "transition matrix" is the collection of all such strings for all possible transitions between all possible old Ls and Hs to new L*s and H*s that are allowed by the rules of the Turing machine. However, only the strings which pertain to the particular L and H in the present particular TM will bind to it. (A "no op" is also possible, if no strings in the transition matrix pertain to the present head state H. This fact may be used to create special "halted" states.)

This binding will be both to the end of the single strand with the old L and H, and also to the other end of the same strand on the other side of the circle with a ,. The result is that the DNA is circular once again, after a healing of the nicks by the application of adenosine triphosphate (ATP) and ligase. For DNA the size of λ phage (48514 base pairs; 16 μm) with sticky ends produced by a restriction enzyme, the circularizing procedure with ligase recommended in the PROMEGA catalog requires 20 minutes at 22° C. The annealing time required (for the transmission matrix strings to bind with their antisense sequences) is difficult to estimate, but based on descriptions of similar procedures, and especially considering the comparatively short length of these sequences, less than an hour should be required. Annealing times grow proportionally to the square root of the effective length of the DNA strands being annealed and to the reciprocal of the molar concentration.

Because the DNAs are physically separated as a result of being bound to anchors attached to a rigid object, this relinking to circular form will not accidentally chain several TM DNAs together. Also, multiple heads cannot append because the transmission matrix strings are unidirectional— they are not available in reversed order (3' to 5') form.

In the next step 40, a polymerase and deoxy-nucleotide triphosphate (dNTP) is added to mixture in order to "fill in the missing pieces" and regain double stranded circular form as shown in FIG. 1, box 40. After polymerization (in steps 40 and 80) application of DNA ligase is required in order to close any nicks of the newly synthesized strand.

In an alternative process for step 40, only new "sense-strand" is synthesized (i.e., the only synthesis that occurs is that required to "fill in" the new L*H* sequence). This is accomplished by using transition matrix strings that have their 3' hydroxyl group removed. Since the polymerase requires a 3' "primer" with an attached hydroxyl, this will prevent any synthesis on the antisense strand. An additional advantage of this alternative process is the avoidance of the linking problem, which occurs if both sense and antisense strands are completed (and the Turing machine is circularized) and the strands will not separate during the denaturation step because they are linked.

It has been reported that E. Coli polymerases I,II,III have speeds of 10, 0.5, 150 bases per second. Higher speeds are available by resorting to the Taq polymerase commonly used in the polyerase chain reaction (PCR) reaction but at the cost of a higher error rate.

The in vitro error rate of the Taq polymerase used in PCR is 1/9000 whereas the Klenow fragment of E. Coli yields 1/12000 in vitro. Nonenzymatic DNA synthesis machines have error and early truncation rates of 1/200 per base. The preferred polymerase is a Klenow fragment of E Coli polymerase I.

In the next step 50, the DNA is melted with a flow of hot water to return to single stranded circular form.

In the next step 60, additional transition matrix strands (or strings) are added to the mixture, except that these strings are slightly different than the ones from step 30 in that they do not extend to the , cut point after the new H* or L*. In FIG. 1 this is referred to as the "truncated transition matrix." After annealing, single strand DNA loops remain but with the portions covered by the old , L , H up to the new H* or L* covered by a second strand.

In the next step 70, the single strand DNA layers are exposed to a restriction enzyme that cuts at a point well inside the , sequence. Since restriction enzymes only cut double stranded DNA, this only cuts at the commas surrounding the old L and H, which is washed away, and leaves the rest of the DNA unaffected. The "sticky ends" left by the restriction enzyme cut are then free to reattach, returning the DNA to circular loops but with the old L and H chopped out. Note that in the original restriction in step 20, no such reattachment in step 70 was possible due to the immediate melting removing the second strand. Also the present reattachment is made permanent by using ligase to seal the nicks.

In the final step 80, polymerase and dNTA is added in order to return the DNA to double stranded form and to fill in any missing pieces. The TM transition process is now completed and is ready to start the next transition at step 20.

By iterating this transition procedure, it is possible to perform as many TM transitions as desired. Note that any incomplete reactions will generally either result in a 'no op' or else be corrected/completed in the next cycle, so the procedure is fairly robust.

Figure 2:
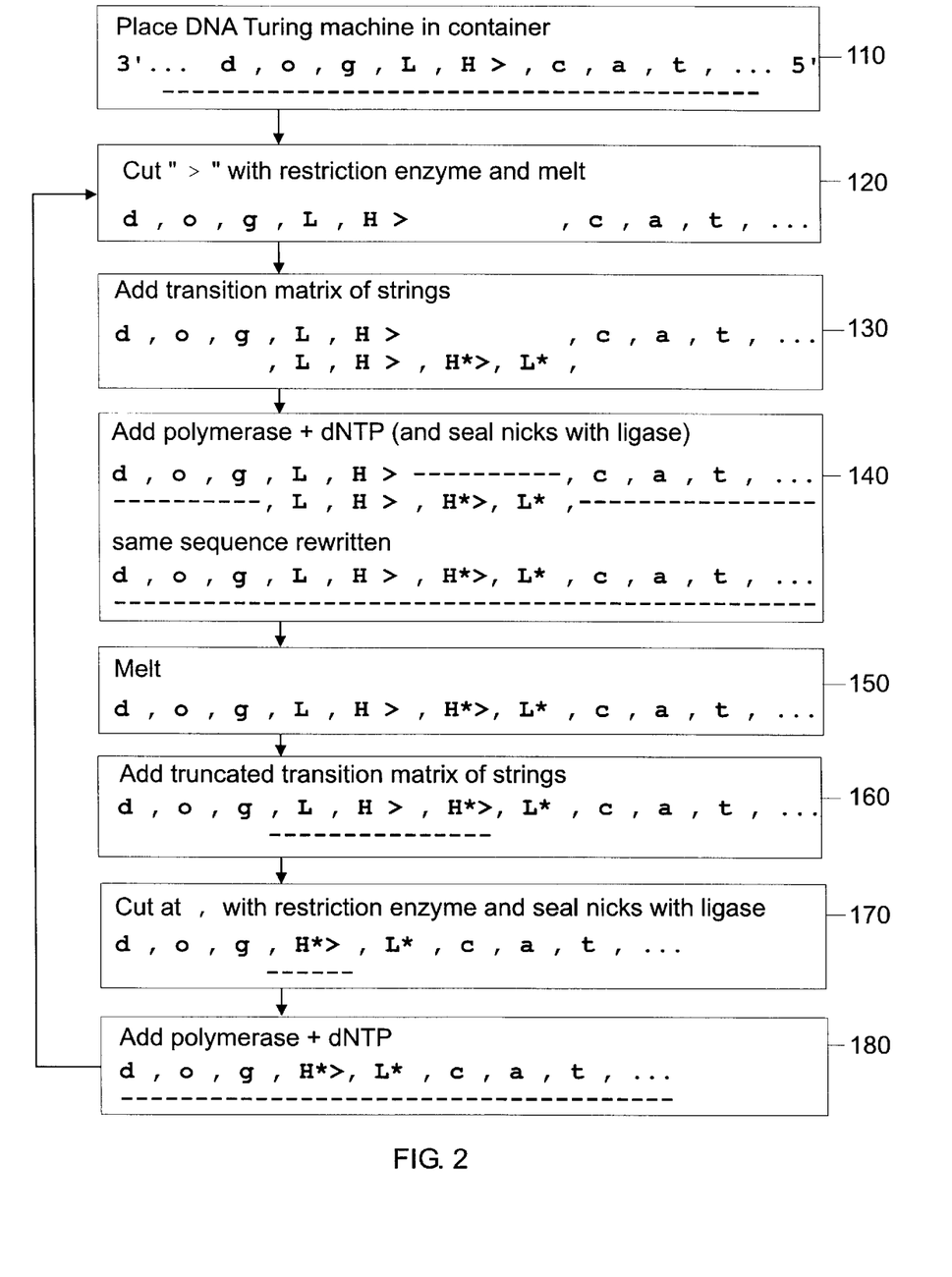
FIG. 2 is a flow chart of an alternative DNA Turing machine transition process where the head moves left and L is not overwritten as L*.

In FIG. 2 there is shown an alternative method of performing the Turing machine transition process where the head moves left each step, instead of staying in place and there is no overwriting of L with L*.

The transition process in FIG. 2 includes the same steps as in FIG. 1 (the reference numerals include the prefix 1). However, since the head will move left, the sequence L* , H* > in steps 30, 40, 50, 60, 70 and 80 in FIG. 1 are replaced with H* >, L* in steps 130, 140, 150, 160, 170 and 180 in FIG. 2. Moreover, in step 60 the second strand binds with L , H >, L* , H* and in step 160 the second strand binds with L , H >, H*>. Also in step 70 the second strand binds with L* but in step 170 the second strand binds with H*>.

Thus far, only a "1-way" Turing machine has been described in which the head can only remain still or move left, but never move right. In fact, it is easy to add further steps of the same type (using different restriction enzymes to permit the head to move right, except that, to simplify matters, all rightward moves will be required to be totally deterministic, and the nondeterministic "two way choice branching" will only be permitted to happen when moving left versus standing still. In the event that the TM head does not move rightward at the moment, then the transition procedure will have no effect on the TM, since there would be no transition matrix element which would bind to the head state, and the result would be a 'no op.'

Figure 3A:
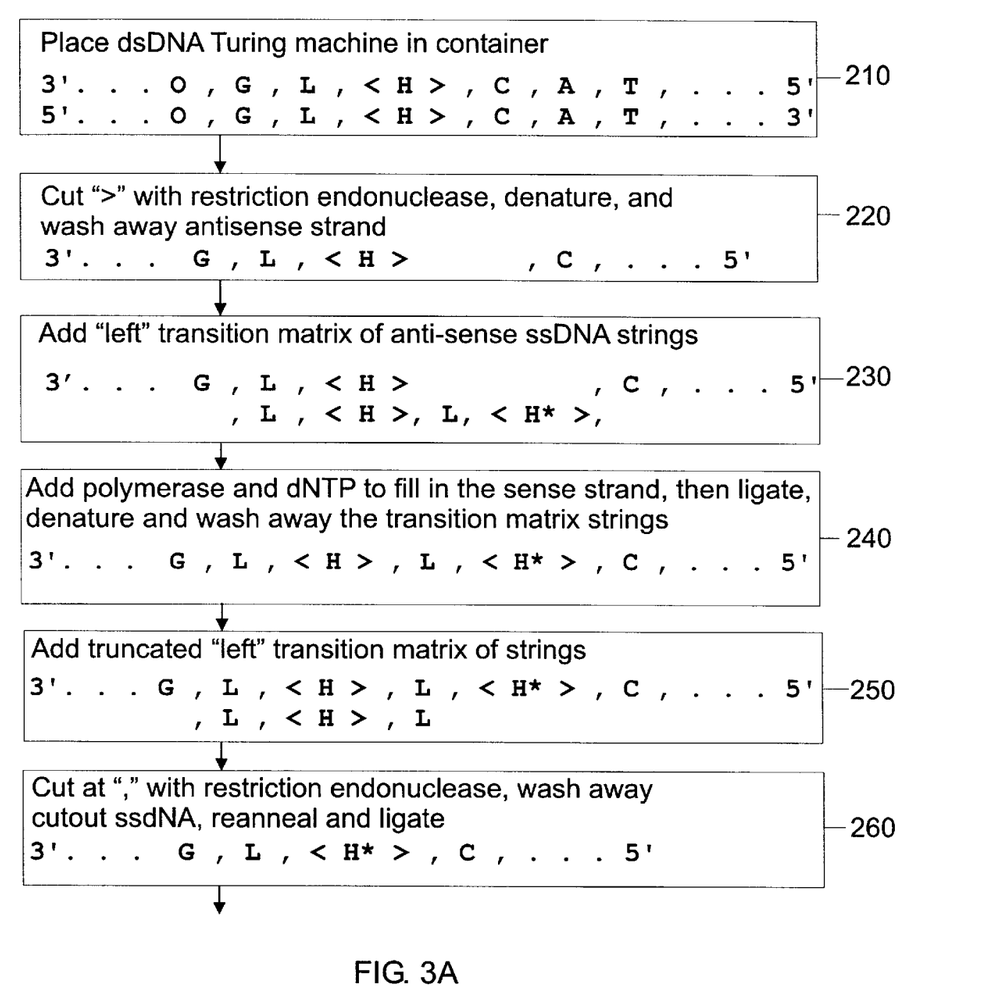
FIGS. 3a and 3b are a flow chart of DNA Turing machine transition process where the head moves right.
Figure 3B:
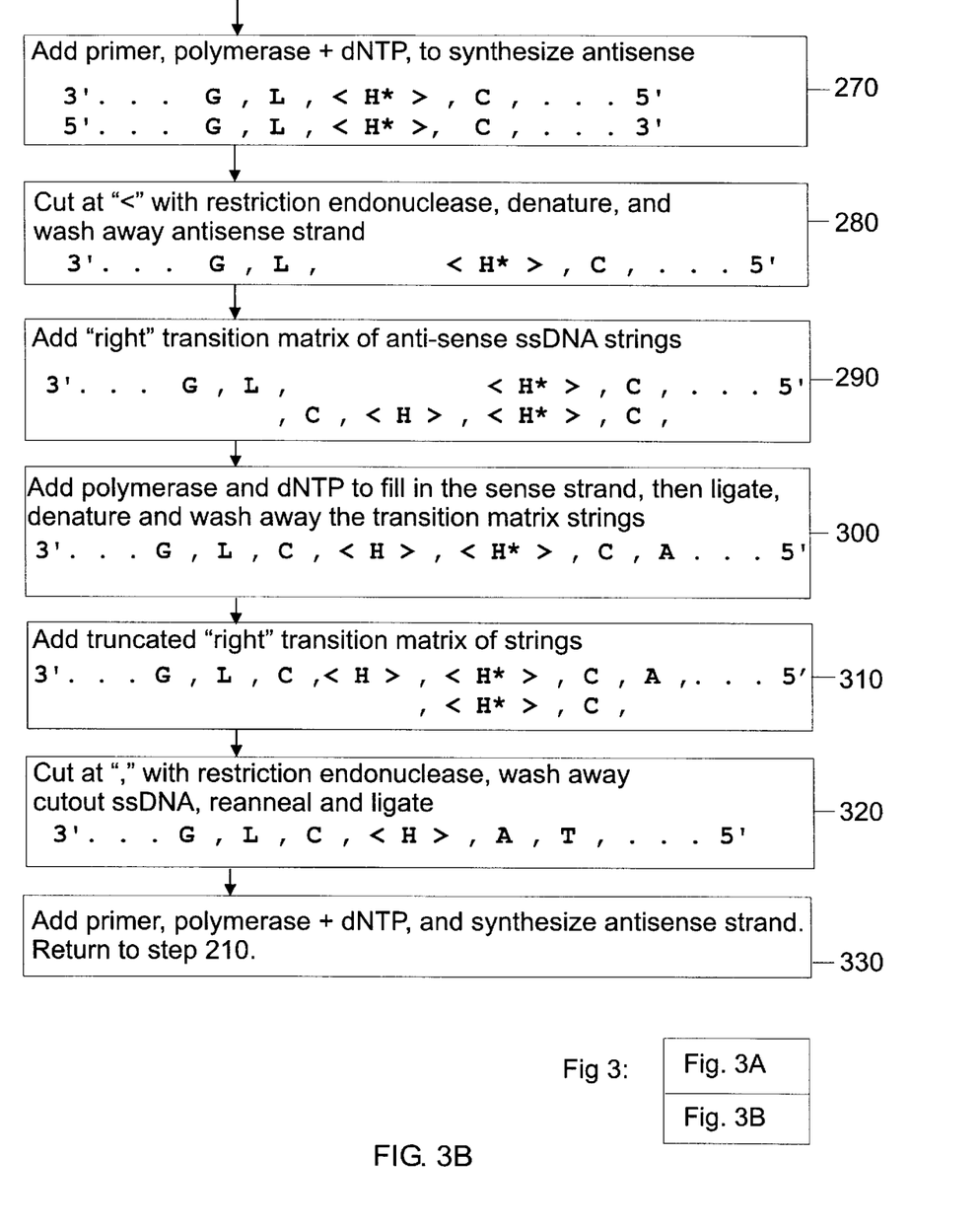

Movement to the "right" requires two additional steps. First, the "head" sequence is bracketed by two distinct restriction-endonuclease cut site sequences. The sequences may be represented by < and >. Thus, the sequence in Step 210 will be d , o , g , L , <H>, c , a, t. Step 220 will be the cut at > step. If the (current symbol, current state) determine that a right move is required, the new H* state sequence will be of a special type (i.e., the number of state sequences is doubled, with one set representing "left" or "no" moves, and the other representing "right" moves). Then a second set of operations, otherwise the same as the procedures described above, but starting with the cut at <. The transition-table strings added at this step will recognize the H*, move it to the right of the 3' symbol, and replace it with H' (the "normal" representation of the new state). The process is shown in FIG. 3.

Although it is generally desirable to maintain the Turing machine in double-stranded (dsDNA) form whenever it will be idle for an extended period, it is not necessary to return to the dsDNA form at the end of every cycle. If the Turing machine is initially in single-stranded (ssDNA) form, the cycle can be initiated by hybridizing with an "initiator" antisense sequence ">,", which suffices to make the ">" double-stranded for cleavage by the restriction endonuclease.

Without much difficulty it is possible to make the Turing machine have the capability, not normally seen in theoretical discussions of Turing machines, of not only overwriting a character on the tape, but in fact inserting a substring into the tape, next to the head, in a single step.

This results in additional possibilities concerning input and output. Suppose the initial tape is totally blank (a periodic sequence blank, comma, blank, comma) except for a head. The head will contain a restriction site of an additional type, so that by a single initial insertion of a giant substring (this could be done in vitro with the use of "integrase" and "IHF" the same way $\lambda$ phage inserts itself into the host genome, or more conventionally with restriction enzyme cuts and ligase) and then write a {input and program} string to all the Turing machines in one initial step. This would provide for an input.

It is comparatively easy to synthesize an initial blank tape by synthesizing a long periodic (blank comma blank comma . . . ) DNA with period <100 base pairs by synthesizing the periods and linking them with ligases. It is possible to synthesize the initial program and data tape even though currently available DNA synthesis machines can only make DNA about 100 base pairs long. A method of synthesizing is to use the Turing machines themselves to synthesize their own input. Specifically, the Turing machine begins by invoking a simple "bootstrap loader" whose purpose is to insert the tape characters forming the input and program (and a supply of blank tape) one (or a few) at a time, using the insertion capability mentioned earlier. Error correction will be discussed below.

As for providing for the output, in many theoretical discussions of Turing machines it suffices merely to be able to tell whether the machine has entered the "halted" state. For that purpose it is possible to expose the strands to antisense DNA (antisense of 'successfully halted head'), bound to dye. The successfully halted TMs will then be colored. Alternatively, the halt state may be made a binding site for a known DNA-binding protein such as the E. Coli lac repressor. However, sometimes it is desired to examine the whole tape. For this purpose it is possible to release all the DNA anchors (photosensitive biotin anchor systems are available which break on exposure to light) and isolate successfully halted TM DNA using the same methods (based on paramagnetic beads bound to antisense DNA for the "halt" state) as were used by Adleman supra. After amplifying this DNA, e.g. inside bacteria, (by isolating a single bacterium and growing it into a colony, a large number of reliable copies of one particular DNA molecule result) it may then be sequenced.

For Turing machines with tapes the rough size of $\lambda$ phage (48514 base pairs), adding up the estimates shows that the transition cycle described above, which implements a single Turing machine transition, will take on the order of a few hours, and will involve an error rate (assuming the steps involving polymerase incur the majority of the error) of approximately 1 incorrect base per 5000 per cycle.

There is reason to believe that if the Turing machine was scaled up to have a tape N times larger, then the time requirement per cycle would increase eventually proportionally to $N^{1.5}$ (with most of the time being required for the circularization steps). Also, it would be necessary to use a smaller amount of DNA (more widely spaced apart to prevent chaining in steps 30 and 70) reduced by an inverse power of N. From the standpoint of theory, any such "polynomial slowdown" does not affect the theorems which say that a Turing machine can simulate any other computer with at most polynomial slowdown. But as far as practice is concerned, this is certainly a limitation.

It should be possible to greatly reduce the error rate. In the future better polymerase systems with error checking and correcting may become available for in vitro use. For the present, it is not necessary to replicate the entire DNA strand for each application of polymerase, it will suffice to terminate the reaction after only the region fairly close to the head H has been converted to double stranded form. Not only will this speed the process, it will also keep the total number of errors low, since errors in replication will only occur in a region within for example, a few hundred bases away from the head. Next, it is possible to use error correcting codes in the transition matrix. By encoding tape characters using a radix-4 block error correcting code, the transition matrix will include corrections for noncodes, so that whenever the head passes over a tape character with a small enough number of substitution errors, it will correct it. As one example of such a code, the quaternary "octacode" which is a set of 256 words of 8 letters over an alphabet of size 4, such that any two codewords are $\geq 3$ mutations apart. To be precise, this code is the linear combinations mod 4 of the rows of

```
11111111
01001213
00103323
00012311.
```

This code will suffice to correct single errors and will allow any choice of 4 bases in any particular 4 places. If we use A=0, C=1, T=2, G=3, then this code also has the property that any two codewords are $\geq 6$ weighted mutations apart, where mutations between letters only 1 apart mod 4, which are comparatively likely, have weight 1, whereas the remaining mutations A$\leftrightarrow$T and G$\leftrightarrow$C have weight 2. Thus it also provides error correction of all weight 2, and detection of weight 3, mutations at no extra cost.

It would also be possible to combine error correcting codes with known DNA-repair enzymes to repair errors throughout a single strand DNA. The method would be to pour in methylated antisense DNA of the tape characters (as before, encoded with radix-4 block error correcting codes) and use ligase to obtain double stranded form. Then repair enzymes which take the methylated strands as correct will snip out erroneous bases on the original single strand and replace them with the correct ones, and then a melt will result in a corrected single strand once again. Such repair cycles could be undertaken occasionally to repair the entire tape. This scheme can reduce the substitution error rate near to thermodynamic limits.

But even without any of these repair procedures, it should be clear that the described methods will suffice to create a Turing machine which will work for sufficiently small scale problems. The difficulties arise when the problems are large.

The operations required for a Turing machine step form a transition cycle whose repetition could be automated. This transition cycle could be completed in a range of between approximately 1 and 200 minutes. With a parallelism factor of $10^{11}$ to $10^{23}$, that would mean that the speedups, as compared to a 100 MHz electronic implementation of a Turing machine, would be in the range $10^{-1}$–$10^{+13}$. The speedup ratio compared to an electronic computer, on problems for which Turing machines are not especially well suited, would be much less.

Assume 10 $\mu$g of 1000-bp loop DNA, i.e. $10^{13}$ molecules, each 0.3 $\mu$m in circumference, bound to some large surface, and that each transition cycle takes one hour. Then 1000 NDTM steps on tapes with approximately 30 characters could be accomplished in about one month, after which time computations would have to cease since a good fraction of the DNAs would have hydrolyzed. Meanwhile a 100 MHz electronic TM would only have accomplished $2.5 \times 10^{14}$ steps, i.e. 40 times fewer steps, but it is doubtful this factor of 40 is enough to overcome the handicaps of being a small Turing machine.

However, it may be possible to use a very large transition matrix, much larger than the matrices found in most theoretical discussions of Turing machines. This might make the task of programming the machine less onerous and involve less steps to perform tasks. It would also allow the use of error correcting codes as discussed above.

It is possible to return Turing machines which have reached an unsuccessful halt state to the computational pool, by the method of programming such machines to back up along the nondeterministic computational tree, until they are ready to resume computing (i.e., not all backtracking has to be done using nondeterminism).

It was stated above that "the maximal speedup factor obtainable from these DNA methods is somewhere between $10^{-2}$ and $10^{+13}$" because the maximal parallelism is between $10^{11}$ and $10^{23}$, it is worth noting that methods might be conceived in which computations happen at more than one place on each DNA molecule, e.g. a multihead Turing machine or 1D cellular automaton. If that were accomplished, an additional factor of perhaps $10^2$–$10^6$ would be exploitable.

In summary, the present invention describes a method of making a universal computer with DNA. Moreover, the described method should result in a computer less prone to error and simpler to make than the previous schemes of Adelman and Lipton.

While the above description refers primarily to a DNA Turing machine, it will be apparent to those skilled in the art that the same methodology is also applicable to RNA and RNA-DNA hybrids for use in any molecular automata.

For instance, the present method avoids PCR, and uses only one step of polymerase, thus allowing the convenient use of a high reliability polymerase. It is not necessary to duplicate the whole genome and does not need to rely on the constant use of polystyrene antisense bead and amplify steps, which might be a large source of possible error and exponentially multiplying losses, and in addition were the biggest percentage of the 7 day lab time requirement for Adleman. In the present invention, the entire cyclic computational process takes place for DNA bound to a single substrate, and thus is presumably immune to loss, in a single receptacle.

While there has been described and illustrated a preferred method of forming a Turing machine using dna, it will be apparent to those skilled in the art that variations and modifications are possible without deviating from the broad principle and spirit of the present invention which shall be limited solely by the scope of the claims appended hereto.

SEQUENCE LISTING ( 1 ) GENERAL INFORMATION:

( i i i ) NUMBER OF SEQUENCES: 7

( 2 ) INFORMATION FOR SEQ ID NO:1:

( i ) SEQUENCE CHARACTERISTICS:
    ( A ) LENGTH: 10 base pairs
    ( B ) TYPE: nucleic acid
    ( C ) STRANDEDNESS: double
    ( D ) TOPOLOGY: linear ( i i ) MOLECULE TYPE: DNA (genomic)

( x i ) SEQUENCE DESCRIPTION: SEQ ID NO:1:

CCWGGGGWCC                                                                                    10

( 2 ) INFORMATION FOR SEQ ID NO:2:

( i ) SEQUENCE CHARACTERISTICS:
    ( A ) LENGTH: 11 base pairs
    ( B ) TYPE: nucleic acid
    ( C ) STRANDEDNESS: double
    ( D ) TOPOLOGY: linear ( i i ) MOLECULE TYPE: DNA (genomic)

( x i ) SEQUENCE DESCRIPTION: SEQ ID NO:2:

CCTNNNNNAG G                                                                                  11

( 2 ) INFORMATION FOR SEQ ID NO:3:

( i ) SEQUENCE CHARACTERISTICS:
    ( A ) LENGTH: 12 base pairs
    ( B ) TYPE: nucleic acid
    ( C ) STRANDEDNESS: double
    ( D ) TOPOLOGY: linear ( i i ) MOLECULE TYPE: DNA (genomic)

( x i ) SEQUENCE DESCRIPTION: SEQ ID NO:3:

GAAGACNNNN NN                                                                                 12

( 2 ) INFORMATION FOR SEQ ID NO:4:

( i ) SEQUENCE CHARACTERISTICS:
    ( A ) LENGTH: 6 base pairs
    ( B ) TYPE: nucleic acid
    ( C ) STRANDEDNESS: double
    ( D ) TOPOLOGY: linear ( i i ) MOLECULE TYPE: DNA (genomic)

( x i ) SEQUENCE DESCRIPTION: SEQ ID NO:4:

AAGCTT                                                                                         6

( 2 ) INFORMATION FOR SEQ ID NO:5:

( i ) SEQUENCE CHARACTERISTICS:
    ( A ) LENGTH: 6 base pairs
    ( B ) TYPE: nucleic acid
    ( C ) STRANDEDNESS: double
    ( D ) TOPOLOGY: linear ( i i ) MOLECULE TYPE: DNA (genomic)

( x i ) SEQUENCE DESCRIPTION: SEQ ID NO:5:

```
G T T A A C                                                                                                6
```

( 2 ) INFORMATION FOR SEQ ID NO:6:

( i ) SEQUENCE CHARACTERISTICS:
        ( A ) LENGTH: 6 base pairs
        ( B ) TYPE: nucleic acid
        ( C ) STRANDEDNESS: double
        ( D ) TOPOLOGY: linear     ( i i ) MOLECULE TYPE: DNA (genomic)

( x i ) SEQUENCE DESCRIPTION: SEQ ID NO:6:

```
G G C G C C                                                                                                6
```

( 2 ) INFORMATION FOR SEQ ID NO:7:

( i ) SEQUENCE CHARACTERISTICS:
        ( A ) LENGTH: 13 base pairs
        ( B ) TYPE: nucleic acid
        ( C ) STRANDEDNESS: double
        ( D ) TOPOLOGY: linear     ( i i ) MOLECULE TYPE: DNA (genomic)

( x i ) SEQUENCE DESCRIPTION: SEQ ID NO:7:

```
G G C C N N N N N G   G C C                                                                               1 3
```

What is claimed is:

1. A Turing machine comprising:
a plurality of circular loops of double stranded DNA, where the DNA has a sequence divided into chunks of predetermined length representing characters on a Turing machine tape, each character being defined by a unique sequence, said DNA being anchored at a fixed location to a surface.

2. A Turing machine as set forth in claim 1, wherein each of the circular loops further comprises a head and an anchor sequence disposed at the end of the circular loop furthest from the head.

3. A Turing machine as set forth in claim 1, wherein each of the circular loop further comprises a subinterval of the DNA referred to as a head and a character immediately adjacent to the head.

4. A method of performing a transition with a Turing machine of DNA comprising the steps of:
disposing a DNA Turing machine in a container;
cutting the DNA at a first predetermined location;
melting the DNA to convert the DNA to a single stranded form:
adding a first transition matrix of DNA strings to the container;
filling in the missing pieces of the DNA;
melting the DNA to reform single stranded circular form DNA;
adding a second transition matrix of DNA strings to the container;
cutting the DNA at a second predetermined location, and reforming the DNA to double stranded form.

5. A method of performing a transition with a Turing machine of DNA as set forth in claim 4, where said cutting the DNA at a first predetermined location comprises adding a restriction enzyme to the container, allowing the restriction enzyme to cut the DNA thereby converting the DNA from circular loops to a linear form, and removing said restriction enzyme from the container.

6. A method of performing a transition with a Turing machine of DNA as set forth in claim 4, where said adding a first transition matrix of DNA strings comprises adding single stranded DNA which includes DNA strings beginning with a sequence which is the antisense of L, H, >, continuing with a comma sequence and further including sequence which is the antisense of a new L*, new H*, >, subsequence which would result from performing one step, where H is the head of the Turing machine, L is the character immediately adjacent to H, > is a cut site and comma separates character sequences of predetermined length.

7. A method of performing a transition with a Turing machine of DNA as set forth in claim 4, where said filling in the missing pieces comprises adding polymerase and deoxy-nucleotide triphosphate.

8. A method of performing a transition with a Turing machine of DNA as set forth in claim 4, where said melting comprises flowing water over the DNA.

9. A method of performing a transition with a Turing machine of DNA as set forth in claim 4, where said adding a second transition matrix comprises adding strings of DNA which do not extend to the comma cut point after a new H* or a new L*.

10. A method of performing a transition with a Turing machine of DNA as set forth in claim 4, where said cutting the DNA at a second predetermined location comprises exposing the DNA to a restriction enzyme which cuts at commas surrounding old L and H, washing the cut DNA, religating the DNA and sealing the nicks.

11. A method of performing a transition with a Turing machine of DNA as set forth in claim 4, where said reforming the DNA comprises adding polymerase and deoxy-nucleotide triphosphate to the container.

12. A method of performing a transition with a Turing machine of DNA as set forth in claim 4, further comprising error correcting codes in said first transition matrix of DNA strings and/or in said second transition matrix of DNA strings.

13. A method of performing a transition with a Turing machine of DNA as set forth in claim 5, where said adding a first transition matrix of DNA strings comprises adding single stranded DNA which includes DNA strings beginning with a sequence which is the antisense of L, H, >, continuing with a comma sequence and further including a sequence which is the antisense of a new L*, new H*, >, subsequence which would result from performing one step, where H is the head of the Turing machine, L is the character immediately adjacent to H, > is a cut site and comma separates character sequences of predetermined length.

14. A method of performing a transition with a Turing machine of DNA as set forth in claim 8, where said adding a second transition matrix comprises adding strings of DNA which do not extend to the comma cut point after a new H* or a new L*.

15. A method of performing a transition with a Turing machine of DNA as set forth in claim 10, said sealing comprising exposing the nicks to ligase.

16. A method of performing a transition with a Turing machine of DNA as set forth in claim 12, further comprising adding a repair enzyme with said first transition matrix of DNA strings and/or said second transition matrix of DNA strings.

17. A method of performing a transition with a Turing machine of DNA as set forth in claim 13, where said filling in the missing pieces comprises adding polymerase and deoxy-nucleotide triphosphate.

18. A method of performing a transition with a Turing machine of DNA as set forth in claim 14, where said cutting the DNA at a second predetermined location comprises exposing the DNA to a restriction enzyme which cuts at commas surrounding old L and H, washing the cut DNA, religating the DNA and sealing the nicks.

19. A method of performing a transition with a Turing machine of DNA as set forth in claim 15, where said reforming the DNA comprises adding polymerase and deoxy-nucleotide triphosphate to the container.

20. A method of performing a transition with a Turing machine of DNA as set forth in claim 16, where said repair enzyme comprises ligase along with methylated antisense DNA.

21. A method of performing a transition with a Turing machine of DNA as set forth in claim 17, where said melting comprises flowing water over the DNA.

22. A method of performing a transition with a Turing machine of DNA as set forth in claim 18, said sealing comprising exposing the nicks to ligase.

23. A method of performing a transition with a Turing machine of DNA as set forth in claim 21, where said adding a second transition matrix comprises adding strings of DNA which do not extend to the comma cut point after a new H* or a new L*.

24. A method of performing a transition with a Turing machine of DNA as set forth in claim 22, where said reforming the DNA comprises, adding polymerase and deoxy-nucleotide triphosphate to the container.

25. A method of performing a transition with a Turing machine of DNA as set forth in claim 23, where said cutting the DNA at a second predetermined location comprises exposing the DNA to a restriction enzyme which cuts at commas surrounding old L and H, washing the cut DNA, religating the DNA and scaling the nicks.

26. A method of performing a transition with a Turing machine of DNA as set forth in claim 23, further comprising error correcting codes in said first transition matrix of DNA strings and/or in said second transition matrix of DNA strings.

27. A method of performing a transition with a Turing machine of DNA as set forth in claim 25, said sealing comprising exposing the nicks to ligase.

28. A method of performing a transition with a Turing machine of DNA as set forth in claim 26, further comprising adding a repair enzyme with said first transition matrix of DNA strings and/or said second transition matrix of DNA strings.

29. A method of performing a transition with a Turing machine of DNA as set forth in claim 27, where said reforming the DNA comprises adding polymerase and deoxy-nucleotide triphosphate to the container.

30. A method of performing a transition with a Turing machine of DNA as set forth in claim 28, where said repair enzyme comprises along with methylated antisense DNA.

31. A method of performing a transition with a Turing machine of DNA comprising the steps of:

disposing a DNA Turing machine in a container;

cutting the DNA at a predetermined location using a restriction enzyme;

removing the restriction enzyme from the container by washing;

melting the DNA by using water at a temperature above the melting temperature of the DNA to convert the DNA to a single stranded form;

washing non-anchored strands from the container;

adding a first transition mixture of DNA strings into a container, where said first transition mixture includes DNA strings which begin with a sequence which is the antisense of L, H, > continue with a comma sequence, and further include a sequence which is the antisense of new L*, new H*, >, comma subsequence which would result from performing one step, where H is the head of the Turing machine, L is the character immediately adjacent to H, > is a cut site and comma separates character sequences of predetermined length;

adding polymerase and deoxy-nucleotide triphosphate to the container to fill in the missing pieces of the DNA and reform the double stranded circular form DNA;

melting the DNA with hot water to reform a single stranded circular form DNA;

washing non-anchored strands from the container;

adding a second transition matrix of DNA strings which strings do not extend to the comma cut point after the new H* or new L*;

adding a restriction enzyme to the container for cutting the DNA at a point inside the comma sequence, washing non-anchored DNA from the container and allowing the DNA to reanneal to reform circular form DNA;

adding ligase to the container to seal the nicks at the cuts, and adding polymerase to the container to form a double stranded form DNA.

32. A method of performing a transition with a Turing machine of DNA as set forth in claim 31, where said first transition matrix and/or said second transition matrix comprises methylated antisense DNA and ligase.

33. A method of performing a transition with a Turing machine of DNA comprising the steps of:

disposing a DNA Turing machine in a container, cutting the DNA at a first predetermined location;

washing away antisense strands;

adding a "left" transition matrix of antisense DNA strings to the container;

filling in the missing pieces of the sense strands;

washing away said "left" transition matrix strings;

adding truncated "left" transition matrix strings to the container;

cutting the DNA at a second predetermined location;

synthesizing antisense DNA strands;

cutting the DNA at a third predetermined location;

adding "right" transition matrix antisense DNA strings to the container;

filling in the sense strands and washing away said "right" transition matrix strings;

adding truncated "right" transition matrix strings;

cutting said DNA at a fourth predetermined location; and synthesizing antisense strands of DNA.

* * * * *